C. W. SNODGRASS.
TIRE CHAIN ATTACHING DEVICE.
APPLICATION FILED JUNE 23, 1922.

1,437,158.

Patented Nov. 28, 1922.

Inventor
C. W. Snodgrass.
By N. E. Dunlap
Attorney

Patented Nov. 28, 1922.

1,437,158

UNITED STATES PATENT OFFICE.

CHARLES W. SNODGRASS, OF MANNINGTON, WEST VIRGINIA.

TIRE-CHAIN-ATTACHING DEVICE.

Application filed June 23, 1922. Serial No. 570,440.

*To all whom it may concern:*

Be it known that I, CHARLES W. SNODGRASS, a citizen of the United States of America, and resident of Mannington, county of Marion, and State of West Virginia, have invented certain new and useful Improvements in Tire-Chain-Attaching Devices, of which the following is a specification.

This invention relates broadly to tire-chain attaching devices, and it has for its primary object to provide a connector-hook carried by an end of a tire chain and a tool whereby said hook may be attached and detached with respect to the opposite end of the chain.

A further object is to provide a connector hook for tire chains and a tool adapted to cooperate with said hook whereby introduction in the latter of a link of the end of the chain opposite that by which the hook is carried is facilitated, to the end that the drawing of the chain into extremely close embracing relation to the tire is rendered possible.

A still further object is to provide a tire-chain connector hook and a combination tool adapted to cooperate with said hook both in effecting attachment and detachment of the latter with respect to an opposite end link of the chain.

In describing the invention in detail, reference is herein had to the accompanying drawings, in which—

Figure 1:
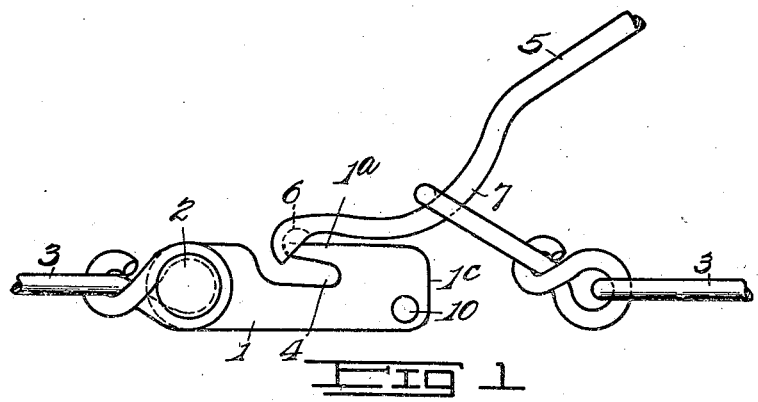
Figure 1 is a side view of the opposite ends of a tire chain illustrating the connector hook and the therewith cooperating tool, said hook and tool being shown in positions assumed in introducing an end link of the chain in the hook.

Referring to said drawings, 1 indicates a connector or coupling hook which is pivotally attached through the intermediacy of a pivot pin or rivet 2 with one end of a side chain 3 constituting a part of a non-skid tire chain. Said hook is formed with a bill $1^a$ which has a slight upward inclination, as shown, and which terminates in a rounded nose $1^b$. Said hook is designed for the reception of one of the end links of the opposite end of the chain 3, whereby said chain is secured in place upon a tire. The slot 4 in which said opposite end link is received terminates at a distance from the free end of the hook approximating the internal length of the link, so that the link cannot become detached from the hook without first being swung to a position out of alinement with the latter; and the edge $1^c$ of said free end is preferably made substantially straight with the end in view to prevent in large measure tendency of the attached link to swing by chance to detaching position.

A bar or rod which constitutes a lever-like tool whereby the free end of the tire chain may be engaged with and disengaged from the hook 1 in applying and removing the chain is indicated generally by the numeral 5. Formed in the under side of said rod adjacent to one end is a shallow-cup like socket 6 designed for the reception of the nose $1^b$ of the hook. The tool has that portion thereof which is located directly adjacent to the socketed end bent downwardly into arcuately curved shape, forming a bow 7.

In applying the chain to a tire, the said bowed end of the tool is first passed through the link which is to be attached to the hook 1, and then the socketed end thereof is seated upon the hook with the nose $1^b$ of the latter received in the socket 6, as shown in Fig. 1. Then, employing said nose as a fulcrum, the free end of the tool is elevated for gradually advancing said link to a point where it passes over the socketed end and drops into seated relation to said hook. As is obvious, a very powerful leverage is obtainable through the use of said tool so that the chain may be drawn about the tire much more tightly than is possible in coupling the ends of chains by hand.

Figures 2, 5:
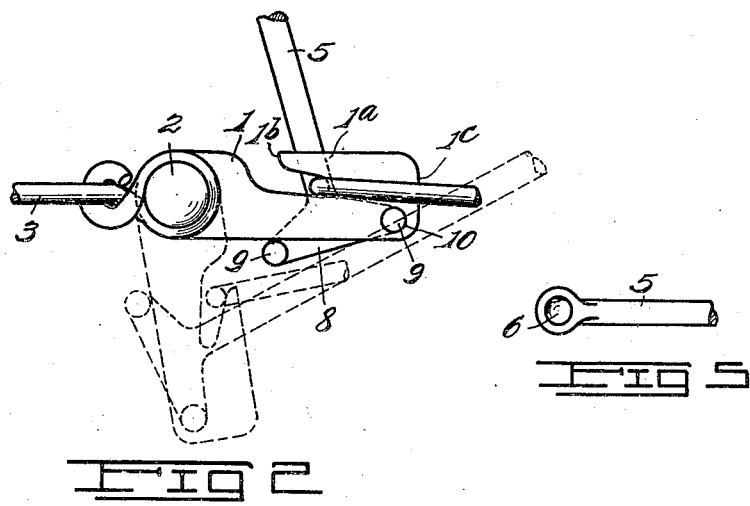
Figure 2 is a view illustrating the tool applied to the hook for disengaging from the latter an attached link.
Figure 5 is a similar view of the coupling end of the tool.
Figure 3:
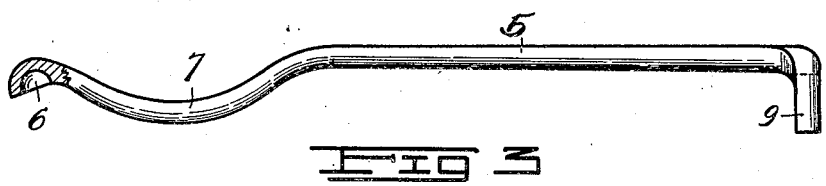
Figure 3 is a side elevation of the tool.
Figure 4:
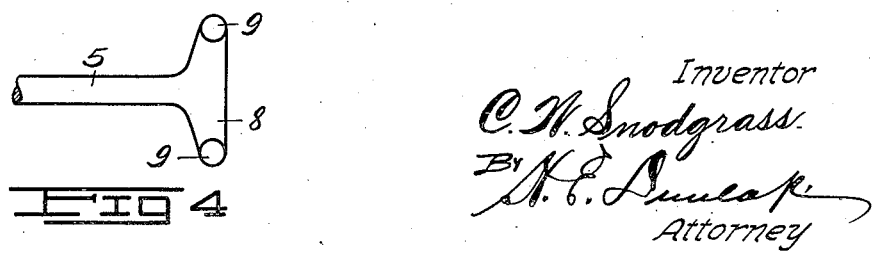
Figure 4 is a face view of the uncoupling end portion of the tool; and—

A crosshead 8 is formed on the opposite end of the tool 5, and formed on opposite ends of said crosshead are short depending prongs 9. To effect uncoupling of the coupled ends of the chain, one of the prongs 9 is inserted in a hole 10 provided therefor at a suitable point in the bill-carrying end of the hook 1, and the other of said prongs is disposed in engagement with the back of said hook, as shown in full lines in Fig. 2, following which said tool is drawn rearward to swing the hook back to approximately the position shown in dotted lines in said figure, at which the said attached link is released.

As hereinbefore indicated, the tool described affords means whereby the chain may be drawn so tightly about a tire that chance disengagement of the link from seated relation to the hook is rendered practically impossible. Further, said tool provides means whereby the ends of the tightly drawn chain may be conveniently uncoupled when desired.

Manifestly, the hook 1 may, if desired, have associated therewith the usual swinging saddle-plate or keeper whereby chance detachment of the hook from an attached end link of the chain is prevented.

What is claimed is—

1. The combination with a tire-chain coupling-hook having a bill at one end and provided with a hole in said end, of a chain coupling and uncoupling tool comprising a lever-like member having a shallow socket in the under side of one of its ends for receiving the end of said bill, and having a crosshead on its opposite end, said crosshead having a pair of prongs thereon, one of said prongs being adapted for insertion in the hole in the hook and the other for seating against the back of said hook.

2. The combination with a tire-chain coupling-hook having a bill at one end and provided with a hole in said end, of a chain coupling and uncoupling tool comprising a lever-like member having a shallow socket in the under side of one of its ends for seating upon the end of said bill as a fulcrum and provided with a bow-like curvature rearward of said socket, the opposite end of said member having a crosshead with outwardly directed prongs thereon, one of said prongs being designed to enter the hole of said hook and the other thereof to seat against the back of said hook in effecting withdrawal of the latter from coupling position.

3. A combination tire-chain coupling and uncoupling tool comprising a rod having a socket in a side thereof adjacent to one end, a crosshead formed on the opposite end of said rod, and prongs carried by the opposite ends of said crosshead.

In testimony whereof, I affix my signature in presence of two subscribing witnesses.

CHARLES W. SNODGRASS.

Witnesses:
VIRGINIA K. LEIGH,
ELIZABETH KNOTTS.